United States Patent
Bodin

(10) Patent No.: US 10,155,545 B2
(45) Date of Patent: Dec. 18, 2018

(54) METHOD OF HOT-SHAPING AND HARDENING AN OBJECT FROM A METAL SHEET, AND A B-PILLAR FOR A VEHICLE

(71) Applicant: Hans Bodin, Sunderbyn (SE)

(72) Inventor: Hans Bodin, Sunderbyn (SE)

(73) Assignee: Gestamp Hardtech AB, Lulea (SE)

(*) Notice: Subject to any disclaimer, the term of this patent is extended or adjusted under 35 U.S.C. 154(b) by 257 days.

(21) Appl. No.: 15/299,543

(22) Filed: Oct. 21, 2016

(65) Prior Publication Data

US 2017/0066481 A1 Mar. 9, 2017

Related U.S. Application Data

(62) Division of application No. 12/310,271, filed as application No. PCT/SE2007/000732 on Aug. 17, 2007, now Pat. No. 9,505,443.

(30) Foreign Application Priority Data

Aug. 25, 2006 (SE) ...................... 0601735

(51) Int. Cl.
- *B62D 25/04* (2006.01)
- *B21D 53/88* (2006.01)
- *B21D 47/01* (2006.01)

(52) U.S. Cl.
CPC ............. *B62D 25/04* (2013.01); *B21D 47/01* (2013.01); *B21D 53/88* (2013.01)

(58) Field of Classification Search
CPC .......... B62D 25/04; B21D 53/88; B21D 47/01
USPC ...................................... 296/193.06
See application file for complete search history.

(56) References Cited

U.S. PATENT DOCUMENTS

| | | | | |
|---|---|---|---|---|
| 3,703,093 | A * | 11/1972 | Komatsu ............... | B21D 24/16 148/647 |
| 6,350,533 | B1 * | 2/2002 | Goto ..................... | B23K 31/12 228/103 |
| 6,524,404 | B2 * | 2/2003 | Gehringhoff .......... | B21D 53/88 148/320 |
| 7,310,878 | B2 * | 12/2007 | Chernoff ............... | B62D 25/20 29/421.1 |
| 7,857,377 | B2 * | 12/2010 | Chen .................... | B62D 25/025 296/203.03 |
| 9,085,323 | B2 * | 7/2015 | Busch .................... | B62D 25/04 |
| 2002/0104591 | A1 * | 8/2002 | Gehringhoff .......... | B21D 53/88 148/320 |
| 2010/0084892 | A1 * | 4/2010 | Yoshida .................. | B21D 7/08 296/203.02 |
| 2012/0186705 | A1 * | 7/2012 | Sikora ................... | B21D 22/02 148/516 |
| 2012/0304448 | A1 * | 12/2012 | Hartmann ............. | B21D 22/208 29/525.06 |

\* cited by examiner

*Primary Examiner* — Joseph D. Pape

(74) *Attorney, Agent, or Firm* — Mark P. Stone

(57) ABSTRACT

A B-pillar for a vehicle is made by the press hardening method. The blank is made by placing two blank elements (20,21) with an overlap (23) and welding the elements together before the shaping process.

13 Claims, 2 Drawing Sheets

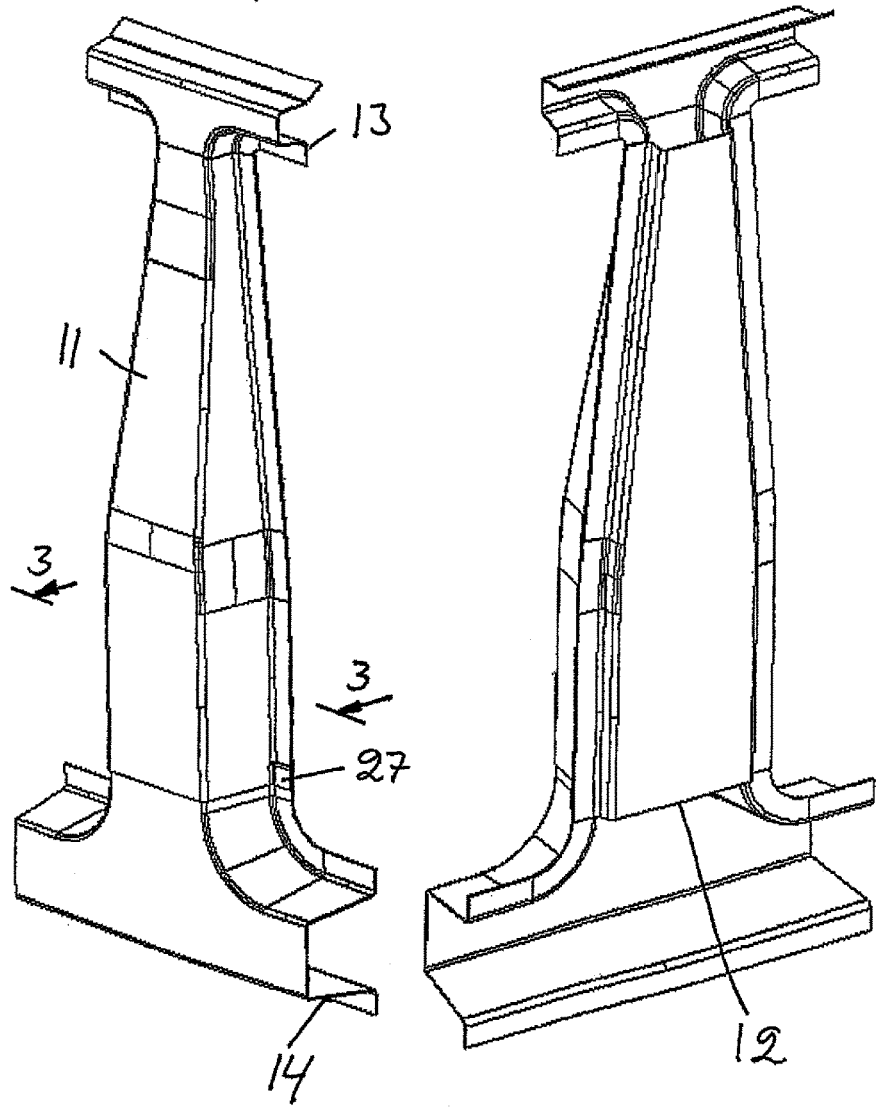

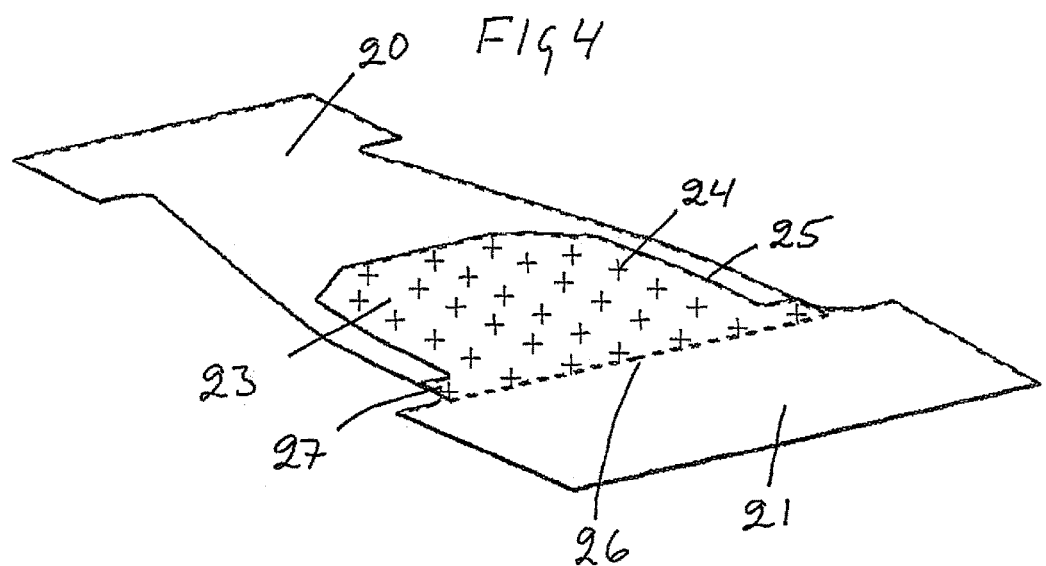
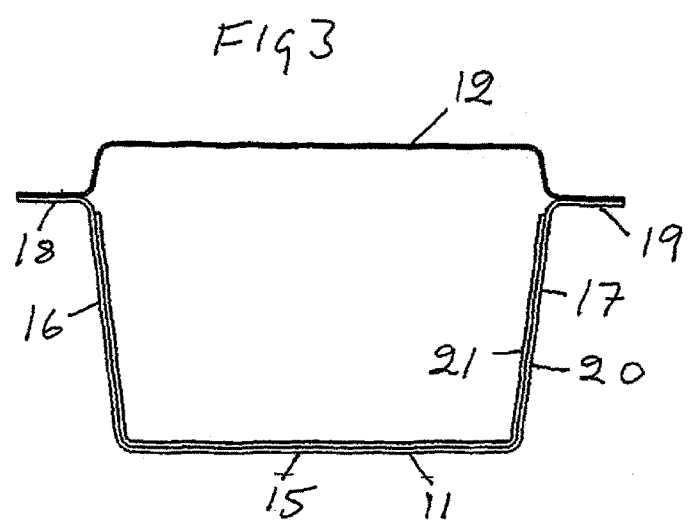

METHOD OF HOT-SHAPING AND HARDENING AN OBJECT FROM A METAL SHEET, AND A B-PILLAR FOR A VEHICLE

The present application is a divisional of application Ser. No. 12/310,271, filed Feb. 17, 2009 (currently pending), which is a 371 of PCT/SE2007/000732, filed Aug. 17, 2007, which claims priority from Swedish Patent Application 06017354-4, filed Aug. 25, 2006. The present application claims the benefit of the aforementioned prior applications pursuant to 35 U.S.C 121, 35 U.S.C. 371, and 35 U.S.C. 119 (a).

TECHNICAL FIELD

The present invention relates to a method of hot-shaping from a sheetmetal blank and hardening a sheetmetal object in a cooled tool, at which there is double sheetmetal in part of the blank and the whole blank is shaped in a single forming operation. The invention also relates to a B-pillar for a vehicle.

STATE OF THE ART

Shaping a sheetmetal blank together with a reinforcing patch in order to create a product is known from EP 1195208 B1 and DE 4307563 A1.

OBJECT AND BRIEF DESCRIPTION OF THE INVENTION

An object of the invention is to provide greater possibilities for choosing freely different characteristics in different portions of a shaped product and to make it easy to achieve different degrees of hardness in different portions of a product formed from a planar sheet steel blank.

This is achieved by making the blank by placing together two blank elements with an overlap and welding them together before the shaping operation so that during that operation the portions with overlapping sheetmetal are shaped and hardened at the same time as the portions of the two blank elements which do not overlap. The invention is defined by the claims.

BRIEF DESCRIPTION OF THE DRAWINGS

FIG. 1 is a perspective view of a B-pillar for a vehicle depicted by way of example of the invention, showing the pillar as seen from outside the vehicle.

FIG. 2 is a perspective view of the B-pillar as seen from inside the vehicle.

FIG. 3 is a cross-section along the line 3-3 in FIG. 1.

FIG. 4 is a perspective view of the blank from which the B-pillar in the above drawings is formed.

DESCRIPTION OF THE ILLUSTRATED AND PREFERRED EMBODIMENT EXAMPLE

FIGS. 1-3 depict by way of example a B-pillar which comprises a hat beam section 11 and a cover 12. The hat beam section is enlarged upwards and downwards to form transverse hat sections 13,14 which are intended to be fastened to the vehicle in order to constitute a load-bearing element of the vehicle. The hat beam section 11 has a central flange 15, two webs 16,17 and two side flanges 18,19.

FIG. 4 depicts the sheet steel blank from which the hat beam section 11 is shaped. It comprises two blank elements 20,21 placed overlapping. FIG. 4 shows the blank element 21 which is to become the pillar's lower portion placed partly on top of the blank element 20 which is to become the upper portion of the pillar. The overlap portion 23 is spot-welded or stitch-welded at points distributed across the whole surface, as indicated by the crosses 24. In addition, the overlap edge is fully welded, i.e. both the edge 25 of the blank element 21 on top of the blank element 20, and the edge 26 of the blank element 20 under the blank element 21, thereby providing not only reinforcement but also protection against crevice corrosion. The edge need not necessarily be fully welded.

The welded-together blank 20,21 is heated in a furnace to austenitising temperature and is hot-shaped in a cooled tool pair, after which it is left with the tools serving as cooling fixtures. This combined shaping and hardening operation is a known process called press-hardening. It is possible to adopt for the upper blank element such a steel grade that the upper portion of the pillar fully hardens and to adopt for the lower blank element a steel grade which is only partly or not at all hardenable. The result is a pillar comprising three portions with different strengths, with a middle portion, the overlap portion, having the greatest strength and a lower portion the least strength. The portion between the hinge fastenings thus becomes the strongest portion. Only the lower portion of the pillar will be subject to corrosion, and the lower blank element 21 may be provided with corrosion protection, whereas the upper portion 20 may be without corrosion protection. Compared with cutting an integral blank, the amount of sheetmetal used is smaller, since the upper blank element 20 is narrower than the lower element and does not need such a broad sheet. The overall result is a B-pillar with desired impact characteristics which costs less than previously and is lighter in weight.

As well as adopting similar or different steel grades, it is also possible to adopt similar or different sheet thicknesses in the two blank elements 20,21.

The cover 12 is welded firmly to the hat beam's side flanges 18,19.

As illustrated in FIGS. 1 and 4, the side flanges constituted by the two blank elements 20,21 have a short overlap 27, whereas the remainder of the overlap portion of the blank 21 is narrower so that it forms no side flange in the overlap region. FIG. 3 depicts the hat beam's overlap portion and the portions constituted by the blank elements 20,21 with these reference notations. The upper blank element 20 is depicted in FIG. 3 on top of the lower element, but the blank 20,21 may alternatively be so formed that the lower blank element comes outermost.

Welding the two blank elements together to form a Taylor blank may with advantage be effected by remote laser welding both for the overlap edges and for the stitching across the overlap surface.

Although the making of a B-pillar is referred to by way of example, the invention is not limited to that product.

The invention claimed is:

1. A B-pillar for a vehicle, said B-pillar comprising a lower portion formed by a first blank element, an upper portion formed by a second blank element, and an intermediate region at which the first and second blank elements are welded together and are thereafter shaped together, said intermediate region formed by overlapping portions of said first and second blank elements, said intermediate region having a strength greater than that of either said lower or upper portions.

2. The B-pillar as claimed in claim 1, wherein the strength of said lower portion is less than the strength of said upper portion.

3. The B-pillar as claimed in claim 1, wherein said B-pillar has at least three areas, each of said areas having different strengths.

4. The B-pillar as claimed in claim 3, wherein the strength of the upper portion is greater than the strength of the lower portion.

5. The B-pillar as claimed in claim 1, wherein said first and second blank elements have different thicknesses such that said upper and lower portions are of different thickness.

6. The B-pillar as claimed in claim 1, wherein said first and second blank elements have different widths such that said upper and lower portions are of different width.

7. The B-pillar as claimed in claim 1, wherein said first and second blank elements are formed from steel having different grades of strength such that said upper and lower portions are formed from steel having a different grade of strength.

8. The B-pillar as claimed in claim 1, wherein said upper and lower portions and said intermediate region each have different strengths from each other.

9. The B-pillar as claimed in claim 1, wherein said overlapping portions of first and second blank elements are spot welded together to form said intermediate region between said upper and lower portions.

10. The B-pillar as claimed in claim 1, wherein said B-pillar is formed, at least in part, from a hat-shape configuration.

11. The B-pillar as claimed in claim 10, wherein said hat-shape configuration comprises a central flange, two webs extending from opposed ends of said central flange, and a side flange extending opposed ends of said webs.

12. The B-pillar as claimed in claim 10, further including a cover mounted over an open portion of said hat-shape configuration.

13. The B-pillar as claimed in claim 12, wherein said cover is mounted to said side flanges.

* * * * *